United States Patent [19]

Bright

[11] 3,787,711
[45] Jan. 22, 1974

[54] ELECTRICAL POWER SUBSTATION

[76] Inventor: William L. Bright, 605 S.W. Curry St., Portland, Oreg. 97201

[22] Filed: Sept. 11, 1972

[21] Appl. No.: 287,752

[52] U.S. Cl. ............................... 317/103, 174/38
[51] Int. Cl. ............................................. H02b 1/20
[58] Field of Search ........... 174/37, 38; 317/15, 103

[56] References Cited
UNITED STATES PATENTS

| | | | |
|---|---|---|---|
| 3,187,175 | 6/1965 | Lang | 174/38 X |
| 3,443,157 | 5/1969 | Uptegraff | 174/37 |
| 3,473,339 | 10/1969 | Schlafly | 174/37 |
| 3,112,183 | 11/1963 | Goff | 174/37 |
| 3,457,428 | 7/1969 | Perry | 174/37 X |
| 3,450,945 | 6/1969 | Wurdack | 174/37 X |

*Primary Examiner*—James D. Trammell
*Attorney, Agent, or Firm*—Eugene M. Eckelman

[57] ABSTRACT

An electrical power substation including a primary side, transformer means, and a secondary side. The primary side comprises a deadend tower to which the incoming lines are attached. The secondary side has a plurality of electrically insulated enclosures mounted on base pads. The enclosures house necessary elements on the secondary side with all bus work therebetween in underground cable.

8 Claims, 4 Drawing Figures

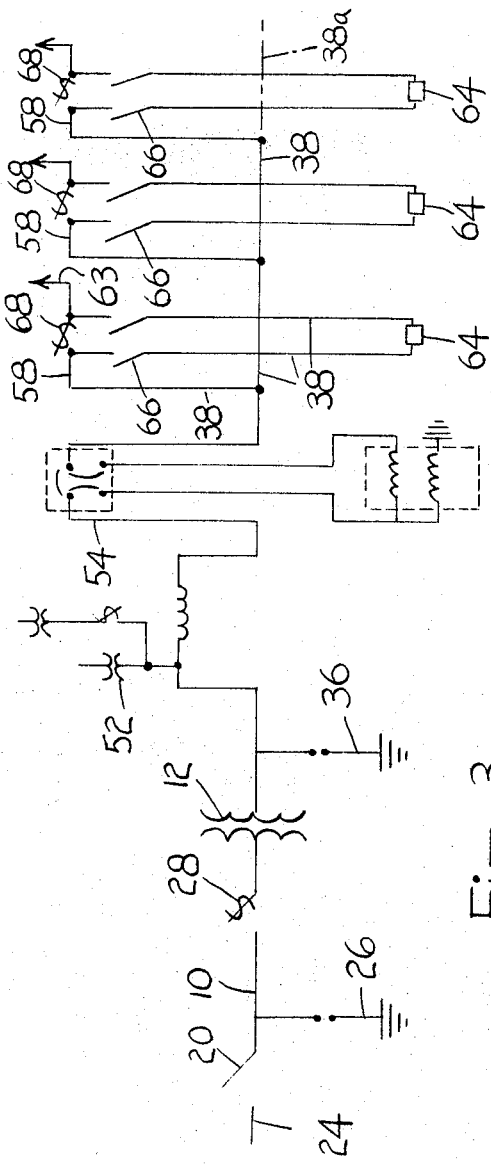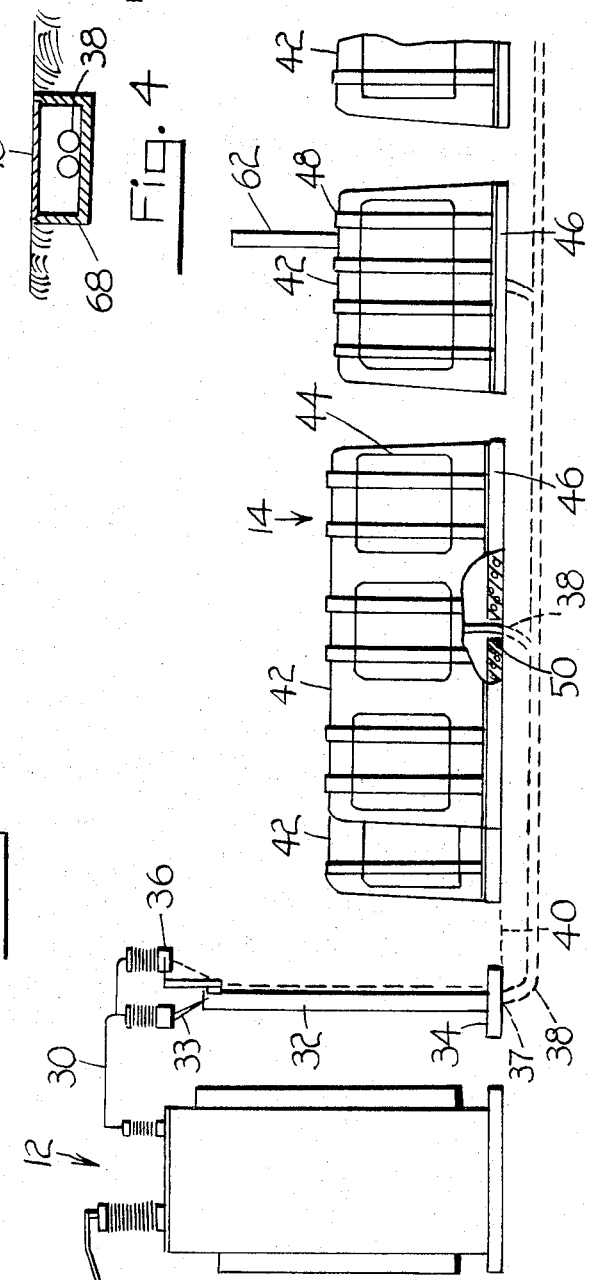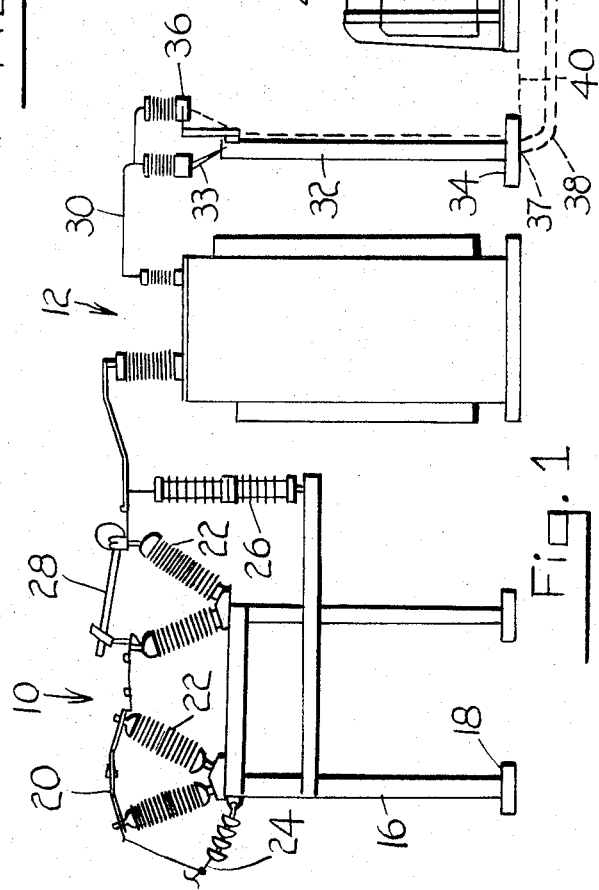

ELECTRICAL POWER SUBSTATION

BACKGROUND OF THE INVENTION

This invention relates to new and useful improvements in power substations.

Power substations are provided at various points throughout an electrical supply system to reduce voltage to the desired level and to distribute such reduced voltage to service areas. Such substations comprise deadend towers having means for receiving incoming high voltage lines and also having necessary switches and fuse assemblies. The lines from the towers extend to transformers, and the outlets from the transformers in conventional substations are connected to above ground metal framework which support and arrange the necessary electrical equipment for distribution. Such electrical equipment comprises primary metering equipment, switch gear equipment, reclosure equipment and the like. All such equipment is in the open, with the various exposed lines being mounted on the framework and suitably insulated from the supporting framework.

Such primary equipment on existing substations has the disadvantage that the lines therein are bare, and it is dangerous for workmen to work on the circuits for maintaining the unit or for altering the circuits. Such bare wires are also dangerous to unauthorized personnel such as children. Another disadvantage is that the complex array of wires and equipment detracts from the appearance of the surrounding environment. Still another disadvantage is that with the wiring and other parts of the circuit being in the open, they are subject to damage from external elements such as rain, ice, wind, falling branches and the like, and in addition are subject to damage by birds, squirrels or other animals which are capable of gaining entrance.

SUMMARY OF THE INVENTION

According to the present invention and forming an important objective thereof, there is provided a power substation arrangement which utilizes on the secondary side base pads for supporting a plurality of electrically insulated enclosures in which electrical equipment is confined.

Another object is to provide a substation which is attractive in appearance, having a low profile allowing it to be readily concealed by fencing or shrubbery.

Another object of the present invention is to provide such an arrangement of equipment on the secondary side utilizing below surface interconnecting bus work whereby lines and other equipment are not exposed to the weather or to individuals who may be present in the substation either with or without authorization.

Still another object is to provide such an arrangement on the secondary side wherein portions of the equipment are remotely housed from reclosers and voltage regulators whereby equipment can be worked on without the possibility of coming in contact with hot lines or equipment.

Yet another object is to provide a substation of the type described which is low in cost and easy to maintain.

The invention will be better understood and additional objects and advantages will become apparent from the following description taken in connection with the accompanying drawings which illustrate a preferred form of the apparatus.

BRIEF DESCRIPTION OF THE DRAWINGS

FIG. 1 is a fragmentary elevational view of a substation embodying features of the present invention;

FIG. 3 is a wiring diagram of elctrical components in the substation; and

FIG. 4 is a sectional view illustrating an underground cable channel which may be used with the present substation.

DETAILED DESCRIPTION OF A PREFERRED EMBODIMENT

Figure 2:
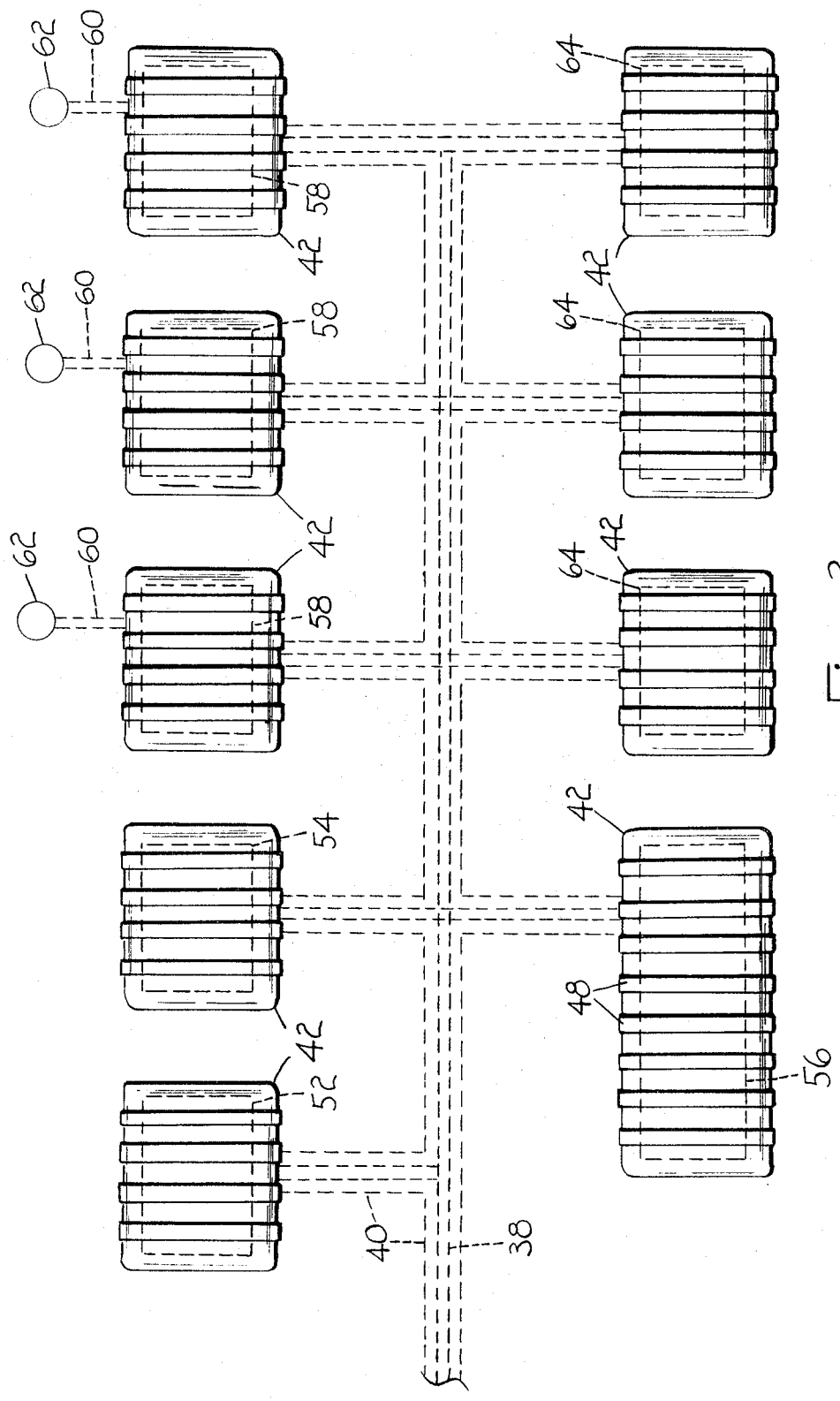
FIG. 2 is a top plan view of the secondary voltage side of the substation.

Referring in particular to the drawings, and first to FIGS. 1 and 3, the general arrangement of the substation of the invention is conventional in that it comprises essentially three portions, namely, a deadend tower assembly 10 on the primary side of the substation, a transformer assembly 12, and a feeder assembly 14 which consists of the secondary side of the substation.

The primary side of the substation, comprising the tower assembly 10, is of conventional construction, consisting of a steel tower 16 seated on suitable footings 18. The upper end of the tower has a switch assembly 20 mounted on the tower by insulators 22 and connected to the incoming lines 24 from the source. Electrical connection between the switch assembly 20 and the transformer assembly 12 is accomplished through power fuses 28. Lightning arrestors 26 furnish protection for the primary voltage side of the substation.

The transformer means 12 is also conventional and has its secondary wiring 30 leading to a pedestal 32 on which the bare wire 30 is converted to insulated cable for underground usage by a pothead 33. Pedestal 32 is supported on a suitable footing 34 and has a secondary voltage lightning arrester 36 at the upper end thereof. The cable outlet from the pedestal at the bottom is designated by the numeral 37 and the cable leading therefrom is designated by the numeral 38. Such outlet leads into one end of a longitudinal ground trench 40 which is dug during installation for leading the cable to other elements or mechanisms of the secondary portion of the substation as will now be described.

The various electrical mechanisms of the secondary side of the substation, also seen in FIG. 2, are confined in enclosures 42. These enclosures comprise housings constructed of an electrically insulated material such as glass fiber and have front and rear doors 44 which provide access to the interior of the enclosures. The enclosures are open at the bottom and seat on individual bases 46, such as a concrete slab, FIG. 1. Such enclosures may be of varying size, as best seen in FIG. 2, depending upon the mechanism to be housed therein. They have ribs 48 for strengthening purposes. The base slab for each of the pedestals has an opening 50, FIG. 1, through which cable 38 passes from the ground into the enclosure.

In one typical substation installation of the invention, the secondary side has a primary metering apparatus 52, FIG. 2, a voltage regulator bypass-disconnect switch 54, and a voltage regulator 56. These elements, as well as the primary side and the transformer, are of conventional construction and are shown in dotted lines. They are further illustrated in the wiring diagram of FIG. 3. Also disposed in the secondary apparatus are fused bypass-disconnect switch mechanisms 58 from which extend outgoing cables 60 which lead to poles 62 outside the substation area from which lines extend to service areas. Disconnect switch mechanisms 58 are also of conventional construction and are shown in dotted lines.

Associated with each fused bypass-disconnect switch mechanism 58 is an oil recloser mechanism 64 which in a typical installation may comprise an oil circuit breaker. With reference to FIG. 3, the main cable 38 may extend beyond the last fused bypass-disconnect switch mechanism 58 and oil circuit recloser 64, as indicated by phantom lines identified by the numeral 38a, to represent future installations for additional outgoing circuits 60.

In the wiring diagram of FIG. 3, it is seen that the wiring on the secondary side leads to the primary metering apparatus 52 and then to the voltage regulator bypass-disconnect switches 54. The circuit leads from this bypass-disconnect switch to the voltage regulator 56 and then to the bypass-disconnect switch mechanisms 58 for the outgoing circuits. Oil recloser bypass-disconnect switch mechanisms 58 are in circuit with their respective oil recloser mechanisms 64. Although the electrical circuitry of the bypass-disconnect switch mechanisms 58 is in common use, it is important to the present invention that each switch mechanism has a manually operated switch portion 66 and a fused switch portion 68. Fuse switch 68 is normally open and the switch 66 normally closed, with the circuit operating through the oil recloser 64. With this arrangement, when it is desired to work on the oil circuit recloser 64, the switch 66 is opened to provide an open circuit to the oil circuit reclosers. The switch 68 in this interim is closed to maintain fuse protection for outgoing circuits.

Suitable trenches 40 are provided under the surface of the ground for cables 38 which connect the various apparatuses in the secondary portion of the substation. The general arrangement of the wiring on the secondary side is best shown in FIG. 3. As stated hereinbefore, the cable 38 extends underground in trenches 40 dug selectively for the various runs of the cable. After the cable 38 is laid, it may merely be covered over. In another embodiment, however, shown in FIG. 4, specific troughs or channels 68 may be constructed to receive the cables 38 therein. These troughs have removable top tread plates 70 for easy access to the cables. The equipment in the secondary portion of the substation can be selectively and easily located or positioned as required to suit otherwise unsatisfactory substation sites. Switch gear enclosures 42 for mechanisms 58, 64 may be added as desired.

The arrangement of the secondary side of the present substation has many advantages. A first advantage is that there is no exposed wiring or equipment and it is thus almost impossible for persons, either authorized or unauthorized, to come in contact with an electrical charge. This provides a substantial improvement over conventional substations wherein substantially all the wires and equipment are exposed.

In the present substation also, a workman can work on one portion of the electrical equipment without the possibility of accidentally touching another portion since individual portions are enclosed within the electrically insulated enclosures 42. It is occasionally necessary that the workmen, for example, work on the oil circuit reclosers 64. Since the oil circuit reclosers are independently and remotely housed from the fused bypass-disconnect mechanisms 58, it is evident that the workmen cannot accidentally touch such other mechanisms when working on the oil circuit reclosers. By the electrical wiring arrangement of the fused bypass disconnect switch mechanisms 58, the switch portion 66 thereof is opened and the fused switch 68 closed, thus providing continued service to the line but at the same time opening the circuit to the oil circuit recloser 64. The workmen thus cannot be exposed to any live wire or equipment whatsoever while working on the said oil circuit recloser.

In addition, the secondary side of the substation, being almost completely housed, cannot be damaged by weather or wild animals or falling debris. Further yet, the enclosures provide an attractive installation as opposed to exposed metal framework, wiring and insulators. The entire secondary side of the substation is lower in elevation than a surrounding security fence. The primary structure may be hidden by a minimum amount of landscaping.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A power substation of the type which is disposed in a single site, said substation comprising a primary side arranged for connection to incoming lines of high voltage, transformer means connected to the lines of said primary side, and a secondary side connected to said transformer means from which outgoing circuits lead to service areas, said secondary side comprising a plurality of individual low profile enclosures, base means for said enclosures, electrical elements in said enclosures forming a part of said outgoing circuits to the service areas, and underground cable means leading from said transformer means to said electrical elements in said enclosures, whereby said cables are concealed as are all the electrical elements on the secondary side from which the outgoing circuits extend.

2. The power substation of claim 1 wherein said enclosures are constructed of an electrically insulated material.

3. The power substation of claim 2 wherein said material comprises glass fiber.

4. The power substation of claim 2 wherein each of said enclosures is open at the bottom and seats on said base means, said base means having at least one aperture through which cables lead for extending below the surface.

5. The power substation of claim 1 including voltage reducing means the output wires from which are bare, and means between said voltage reducing means and said electrical elements converting said bare wires to covered wire.

6. The power substation of claim 5 wherein said means for converting said bare wires to covered wire comprises a pedestal supporting a pothead thereon.

7. The power substation of claim 2 wherein said electrical elements include a switching mechanism and bypass mechanism in one of said enclosures and operative means in another one of said enclosures controlled by said switching mechanism, whereby upon opening said switching mechanism and engaging said bypass mechanism said operative means can be worked on, with the workman being isolated from the switching bypass mechanism.

8. The power substation of claim 2 wherein said electrical elements include a switching mechanism and by-pass mechanism in one of said enclosures and operative means in another one of said enclosures controlled by said switching mechanism, whereby upon opening said switching mechanism and engaging said bypass said operative means can be worked on, with the workman being isolated from the switching and bypass mechanism, and outlet cables from said switching mechanism extending below the surface for connection to output circuits to service areas.

* * * * *